(12) United States Patent
Trifunovic

(10) Patent No.: US 7,530,185 B2
(45) Date of Patent: May 12, 2009

(54) ELECTRONIC PARALLEL LIFT AND RETURN TO CARRY ON A BACKHOE LOADER

(75) Inventor: Boris Trifunovic, Durango, IA (US)

(73) Assignee: Deere & Company, Moline, IL (US)

( * ) Notice: Subject to any disclaimer, the term of this patent is extended or adjusted under 35 U.S.C. 154(b) by 87 days.

(21) Appl. No.: 11/767,214

(22) Filed: Jun. 22, 2007

(65) Prior Publication Data
US 2008/0313935 A1    Dec. 25, 2008

(51) Int. Cl.
E02F 5/02 (2006.01)
(52) U.S. Cl. .............................. 37/348; 37/414; 172/2; 414/700
(58) Field of Classification Search .................... 37/348, 37/414–416, 382, 443; 414/699, 700, 701, 414/708, 709; 172/2, 4, 4.5, 3; 701/50
See application file for complete search history.

(56) References Cited

U.S. PATENT DOCUMENTS 5,850,035 A * 12/1998 Layton et al. ............. 73/504.16
5,887,365 A * 3/1999 Fujishima et al. ............. 37/348
6,003,373 A * 12/1999 Moore et al. ............. 73/504.16
6,108,948 A * 8/2000 Tozawa et al. ................. 37/348
6,233,511 B1 * 5/2001 Berger et al. .................. 701/50
6,356,829 B1 * 3/2002 Fan et al. ...................... 701/50
6,363,632 B1 * 4/2002 Stentz et al. .................. 37/414
6,609,315 B1 * 8/2003 Hendron et al. ............... 37/348
7,222,444 B2 * 5/2007 Hendron et al. ............... 37/348

* cited by examiner

Primary Examiner—Robert E Pezzuto

(57) ABSTRACT

A backhoe loader with a controller that uses angular signals from at least one sensor to calculate a loader tool angle with respect to the vehicle frame or with respect to the earth and to maintain the loader tool angle via controller generated commands to a tool actuator as a function of the angular signals and commands to a boom actuator. The controller enables proportional control of the tool angle via a command input device such as an electronic joystick. If the electronic joystick is moved to an appropriate detent position, the controller executes a return to carry function.

27 Claims, 12 Drawing Sheets

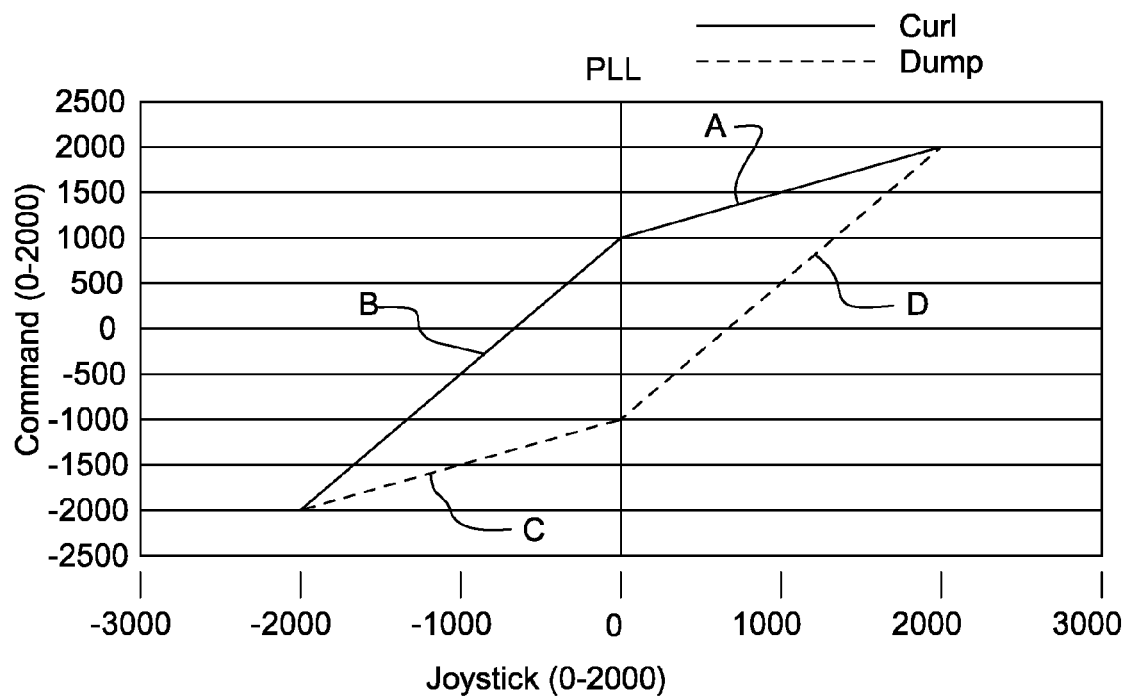
Fig. 6
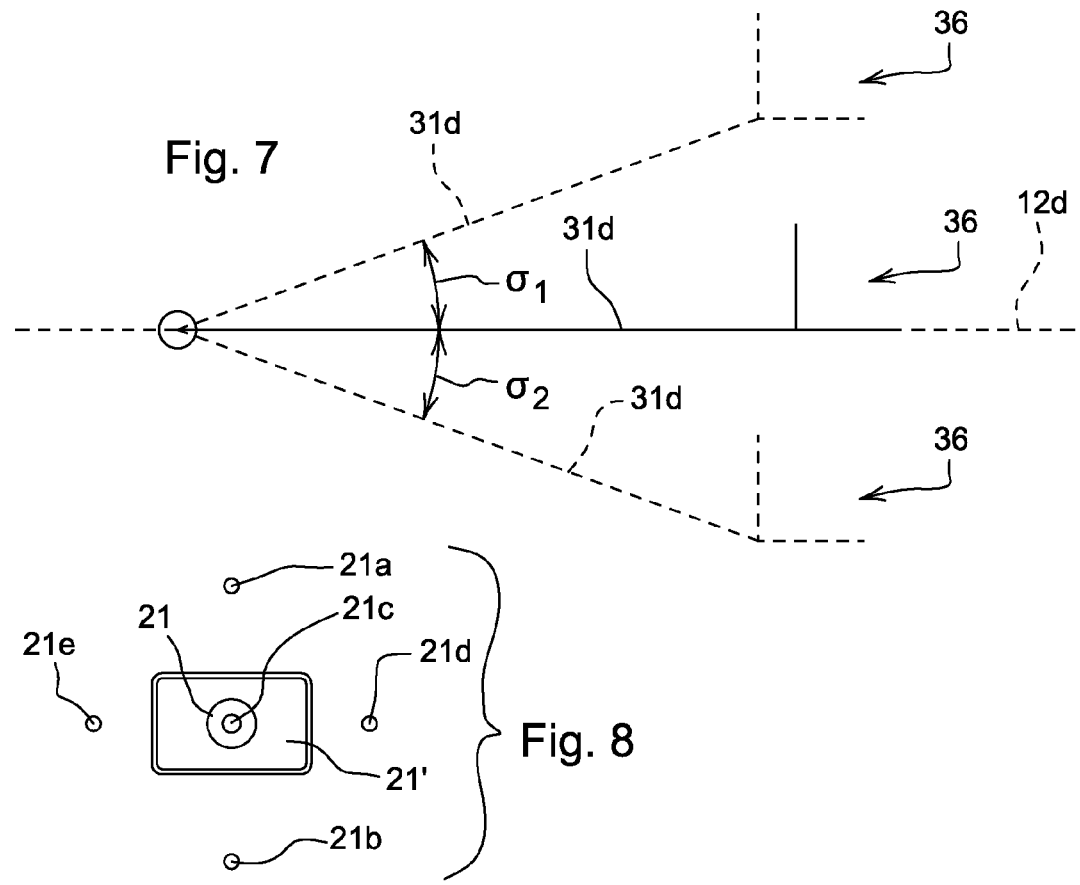
Fig. 7
Fig. 8

ELECTRONIC PARALLEL LIFT AND RETURN TO CARRY ON A BACKHOE LOADER

FIELD OF THE INVENTION

The invention relates to a system for sensing and automatically controlling the orientation of a work tool.

BACKGROUND OF THE INVENTION

A variety of work machines can be equipped with tools for performing a work function. Examples of such machines include a wide variety of loaders, excavators, telehandlers, and aerial lifts. A work vehicle such as backhoe loader may be equipped with a backhoe tool, such as a backhoe bucket or other structure, for excavating and material handling functions as well as a loader tool such as a loader bucket.

In the backhoe portion of the backhoe loader, a swing frame pivotally attaches to the vehicle frame at a rear portion of the vehicle, a backhoe boom pivotally attaches to the swing frame, a dipperstick pivotally attaches to the backhoe boom, and the backhoe tool pivotally attaches to the dipperstick about a backhoe tool pivot. A vehicle operator controls the orientation of the backhoe bucket relative to the dipperstick by a backhoe tool actuator. The operator also controls the rotational position of the boom relative to the vehicle frame, and the dipperstick relative to the boom, by corresponding actuators. The aforementioned actuators are typically comprised of one or more double acting hydraulic cylinders and a corresponding hydraulic circuit.

In the loader portion of the backhoe loader the loader boom is pivotally attached to the vehicle frame at a front portion of the backhoe loader and a loader tool, such as a loader bucket, is pivotally attached to the loader boom at a loader bucket pivot. Typically, the bucket is operatively attached to a linkage which is also connected to the vehicle frame or the boom. Work operation with a loader bucket entails similar problems to those encountered in work operations with the backhoe bucket.

During a work operation with a loader tool, such as lifting, lowering or dumping material, it is desirable to maintain an initial orientation relative to the frame of the vehicle to prevent premature dumping of material, or to obtain a constant loader tool angle. In conventional backhoe loaders, the operator is required to continually manipulate a loader tool command input device to adjust the loader tool orientation as the loader boom is moved during the work operation to maintain the initial loader tool orientation relative to the vehicle frame. The continual adjustment of the loader tool orientation, combined with the simultaneous manipulation of a loader boom command input device, requires a degree of operator attention and manual effort that can diminish overall work efficiency and increase operator fatigue.

A number of mechanisms and systems have been used to automatically control the orientation of work tools such as loader buckets. Various examples of electronic sensing and control systems are disclosed in U.S. Pat. Nos. 4,923,326, 4,844,685, 5,356,260, 6,233,511, and 6,609,315. Control systems of the prior art typically utilize position sensors attached at various locations on the work vehicle to sense and control tool orientation relative to the vehicle frame. Additionally, the U.S. Pat. No. 6,609,315 makes use of an angular velocity sensor attached to the tool to sense and maintain a fixed work tool orientation relative to an initial tool orientation, independent of vehicle frame orientation. Also, U.S. Pat. No. 7,222,444, makes use of a tilt sensor that, when attached to an object, such as the tool, detects the object's inclination with respect to the earth.

SUMMARY OF THE INVENTION

An object of the present invention is to provide an improved system for controlling the orientation of a tool for a work vehicle.

The illustrated invention comprises a backhoe loader which includes a backhoe assembly, and a loader assembly. The backhoe assembly includes a swing frame pivotally attached to the frame of the backhoe loader, a backhoe boom pivotally attached to the swing frame, a backhoe boom actuator for controllably pivoting the boom relative to the swing frame, a dipperstick pivotally attached to the boom, a dipperstick actuator for controllably pivoting the dipperstick relative to the boom, a backhoe to definitely attest to the dipperstick, and a backhoe to actuator for controllably moving the backhoe tool about its pivot.

The loader assembly includes a loader boom pivotally attached to the vehicle frame, a loader boom actuator for controllably pivoting the loader boom relative to the vehicle frame, a loader tool pivotally attached to the loader boom, and a loader tool actuator for controllably pivoting the loader tool relative to the loader boom. The loader also includes a loader tool command device to effect operation of the loader tool actuator and a mode switch to enable and disable features of the invention. The invention addresses the loader portion of the backhoe loader.

In the invention, the vehicle has at least one of a first mode and a second mode, each mode being enabled by a mode switch. In the first mode a controller allows the loader tool to respond to boom manipulation in a conventional manner, i.e., the angle of the loader tool is adjusted on a strictly mechanical basis in accordance with the mechanical interplay between the boom, a loader tool linkage and the loader tool. In the second mode, which is a parallel lift mode a controller causes the angle of the tool to be adjusted in accordance with an electronic program throughout an angular movement of the boom regardless of any particular mechanical relationship between the tool linkage, the boom and the loader tool. In the second mode, the invention uses at least one sensor to detect an angle of a loader tool with respect to a datum such as, for example, the vehicle frame and maintain that angle throughout a boom rotation with respect to the datum unless parallel lift is deactivated during boom travel or the boom reaches an angle in which another function takes precedence. The controller maintains the tool orientation by commanding the tool actuator to adjust the tool position as a function of the boom angle with respect to the vehicle frame. The initial tool angle is set and stored at the time parallel lift is activated and updated each time the tool angle is changed via the manipulation of a tool command input device such as, for example, a joystick as long as parallel lift is enabled. When parallel lift is deactivated, i.e., disabled, the vehicle returns to the first mode and no new angles are set or updated until parallel lift is re-enabled.

The invention provides for other functions for controlling the loader tool such as, for example, return to carry, return to dig and anti-spill which is designed to keep a loader bucket from spilling its contents on the hood or cab of the vehicle.

BRIEF DESCRIPTION OF THE DRAWINGS

FIG. 4b illustrates more graphically how the angle of the loader tool with respect to the boom changes in FIG. 4a;

FIG. 6 graphically illustrates how the loader tool responds to one example joystick override command while parallel lift is enabled;

FIG. 7 illustrates how the angle of the loader changes as the boom moves toward σ1 and toward σ2 while parallel lift is enabled;

FIG. 8 illustrates various detent positions;

DESCRIPTION OF THE PREFERRED EMBODIMENT

Figure 1:
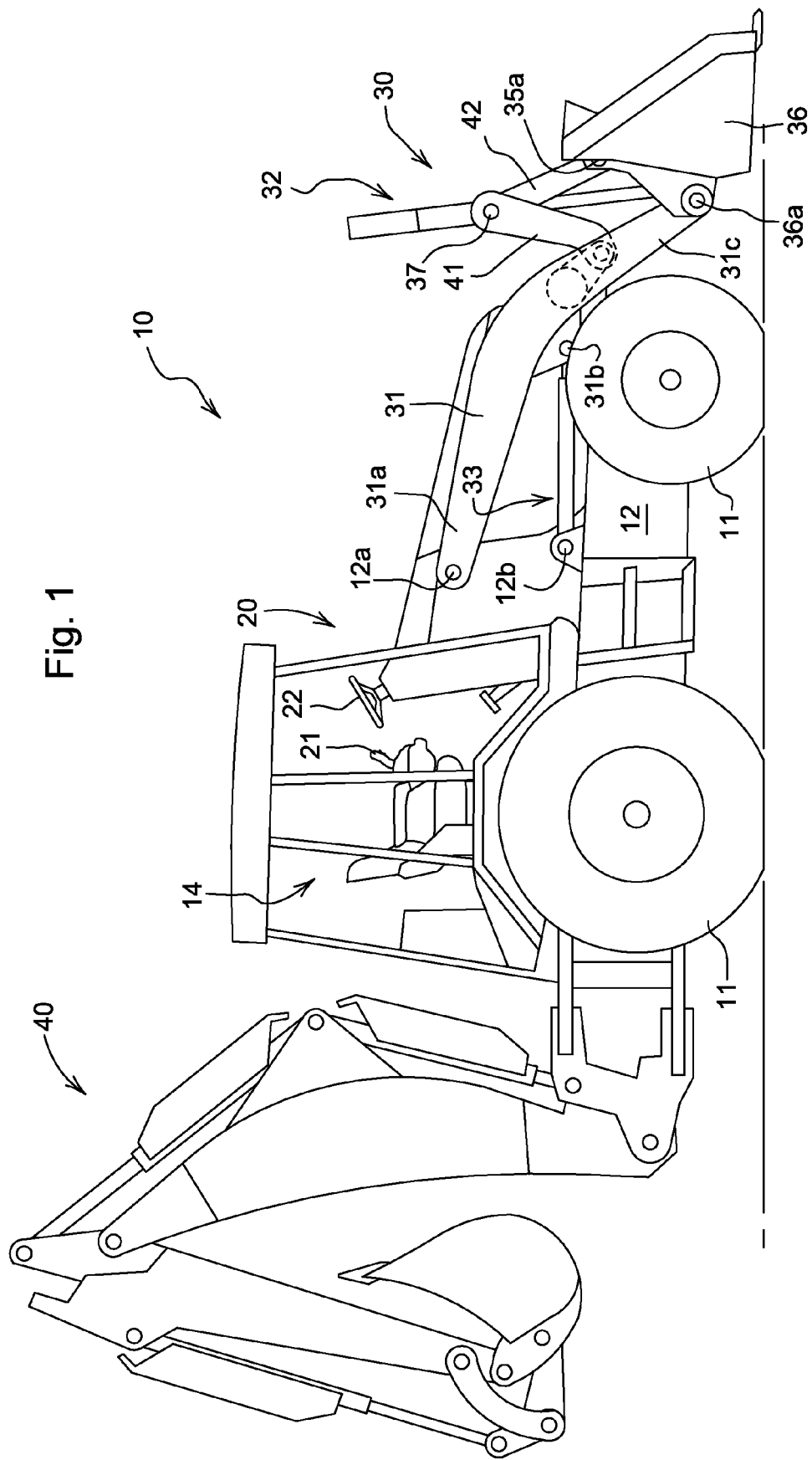
FIG. 1 is a side view of a backhoe loader.

FIG. 1 illustrates an exemplary work vehicle, i.e., a backhoe loader 10 in which the invention may be utilized. The backhoe loader 10 has a frame 12, to which are attached ground engaging wheels 11 for supporting and propelling the vehicle 10. Attached to the front of the vehicle is a loader assembly 30, and attached to the rear of the vehicle 10 is a backhoe assembly 40. Both the loader assembly 30 and backhoe assembly 40 perform a variety of material handling functions. An operator controls the functions of the vehicle 10 from an operator's station 20.

This particular loader assembly 30 comprises a loader boom 31, a linkage 40 and a tool such as, for example, a loader bucket 36. The loader boom 31 has a first end 31a pivotally attached to the frame 12 at a horizontal loader boom pivot 12a, and a second end 31c to which the loader bucket 36 pivotally attaches at loader bucket pivot 36a.

Figure 2:
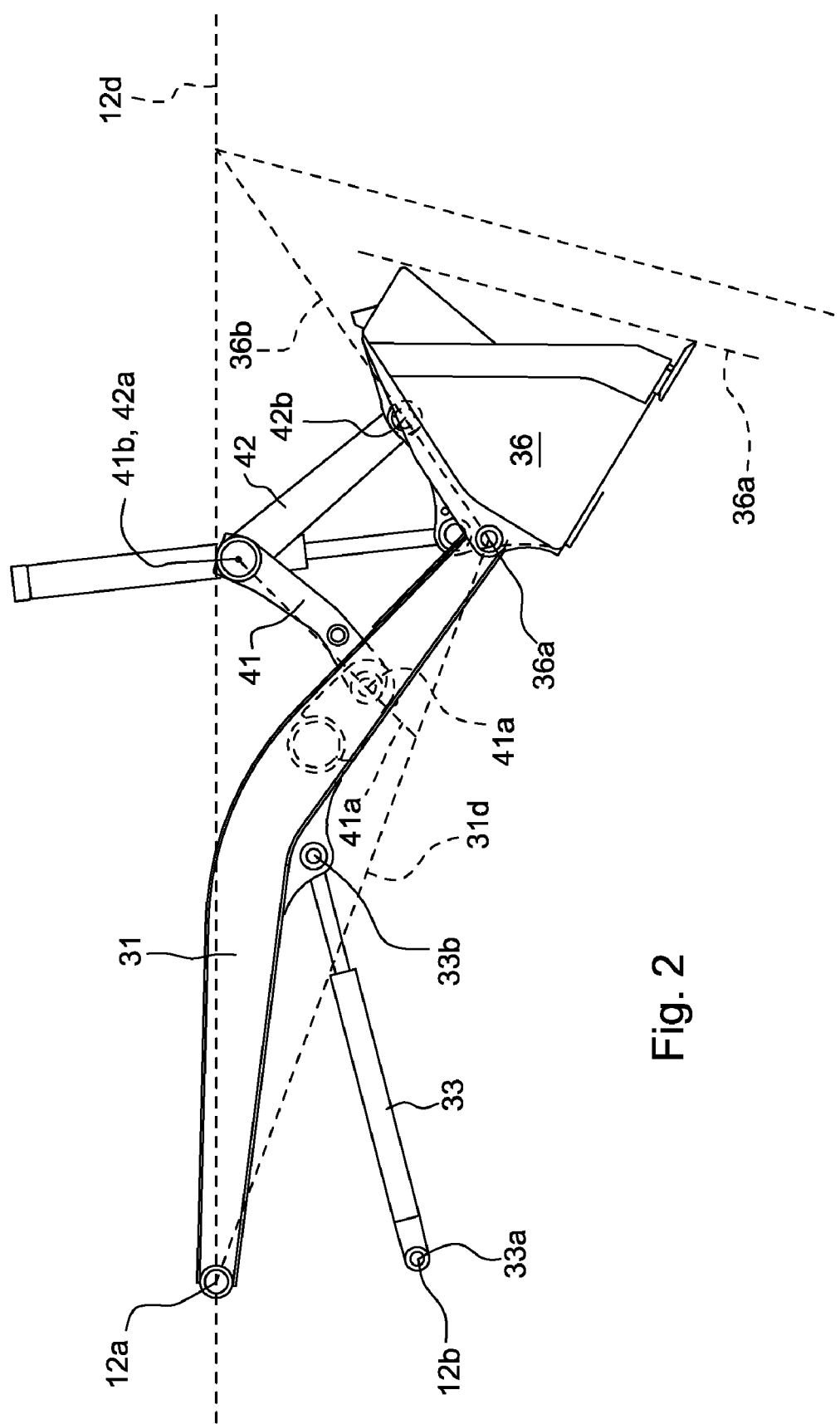
FIG. 2 is a detailed view of a loader portion of the backhoe loader.

The linkage 40, illustrated in FIG. 2, includes a boom link 41 and a bucket link 42. The boom link 41 is pivotally attached to the boom 31 at a first boom link pivot 41a and pivotally attached to a loader bucket hydraulic cylinder 32 at a second boom link pivot 41b. The bucket link 42 is pivotally attached to the loader bucket hydraulic cylinder 32 at a first bucket link pivot 42a and pivotally attached to the bucket 36 at a second bucket link pivot 42b. In this particular case, the second boom link pivot 41b and the first bucket link pivot 42a are the same, i.e., they are both pivot 41a. As the loader bucket hydraulic cylinder extends and retracts, an angle θ between the boom link 41 and the bucket link 42 increases and decreases respectively.

Figure 3:
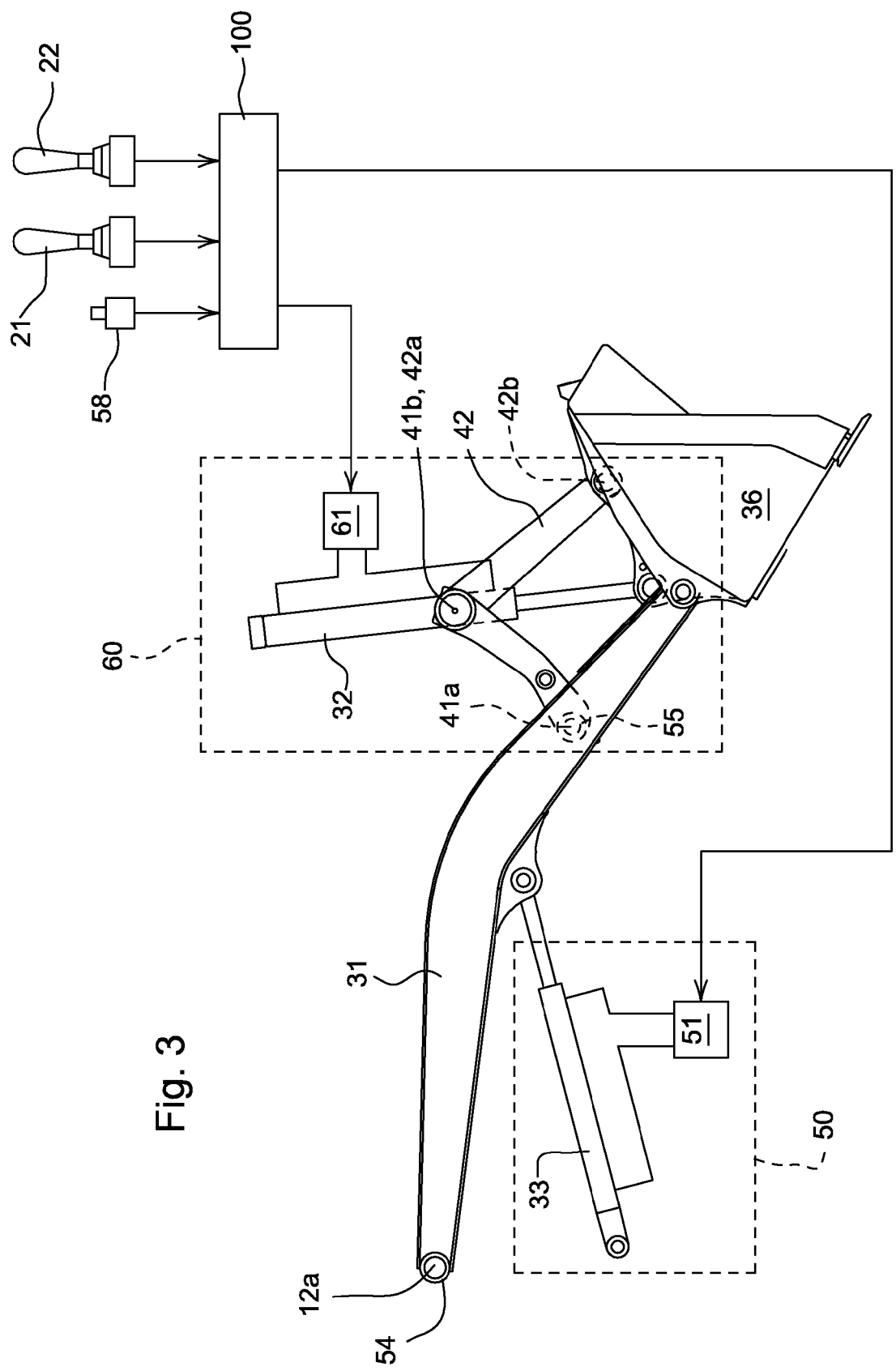
FIG. 3 is a schematic diagram illustrating an exemplary embodiment of the components of the invention with respect to a control system for the loader tool.

FIG. 3 illustrates a schematic representing an exemplary embodiment of the invention. In FIG. 3, a loader boom actuator 50, having a loader boom hydraulic cylinder 33 extending between the vehicle frame 12 and the loader boom 31, controllably moves the loader boom 31 about the loader boom pivot 12a. The loader boom hydraulic cylinder 33 is pivotally attached to the frame 12 at a first loader boom hydraulic cylinder pivot 33a and pivotally attached to the loader boom 31 at a second loader boom hydraulic cylinder pivot 33b. In the illustrated embodiment, the loader boom actuator 50 comprises a boom electro-hydraulic circuit 51 hydraulically coupled to the loader boom hydraulic cylinder 33. A controller 100 supplies and controls the flow of hydraulic fluid to and from the loader boom hydraulic cylinder 33 via the loader boom electro-hydraulic circuit 51. The controller 100 may take many forms from a hard wired or mechanical device to a programmable computer. In this embodiment of the invention, the controller 100 comprises a programmable on-board electronic computer.

A loader bucket actuator 60, having a loader bucket hydraulic cylinder 32 extending between the loader boom 31 and the loader bucket 36, controllably moves the loader bucket 36 about the loader bucket pivot 36a. In the illustrated embodiment, the loader bucket actuator 60 comprises a bucket electro-hydraulic circuit 61 hydraulically coupled to the loader bucket hydraulic cylinder 32. The controller 100 controls the bucket electro-hydraulic circuit 61 which supplies and controls the flow of hydraulic fluid to the loader bucket hydraulic cylinder 32. Note that the boom electro-hydraulic circuit 51 and the bucket hydraulic circuit 61 are conventionally configured and may have significant commonality; they may, in fact, be the same circuit.

The operator commands movement of the loader assembly 30 by manipulating a loader bucket command input device such as, for example a joystick 21 and a loader boom command input device such as, for example the joystick 21. The joystick 21 is adapted to generate a loader bucket command signal 28 in proportion to a degree of manipulation by the operator and proportional to a flow rate of fluid to the bucket hydraulic cylinder 32 which is indirectly proportional to an angular speed of a desired loader bucket movement. The controller 100, in communication with the loader bucket command input device 21 and loader bucket actuator 60, receives the loader bucket command signal 28 and responds by generating a controller bucket command signal 102 proportional to the bucket command signal 28, which is received by the loader bucket electro-hydraulic circuit 61. The loader bucket electro-hydraulic circuit 61 responds to the controller bucket command signal 102 by directing hydraulic fluid to and from the loader bucket hydraulic cylinder 32, causing the hydraulic cylinder 32 to extend and retract and curl and dump the loader bucket 36 accordingly.

The joystick 21 is adapted to generate a loader boom command signal 29 in proportion to a degree of manipulation in a first direction of the joystick 21 by the operator, the boom command signal 29 being proportional to a flow rate of fluid to the hydraulic boom cylinder 33 and indirectly proportional to a speed of a desired loader boom movement. The controller 100, in communication with the joystick 21 and loader boom cylinder 33, receives the loader boom command signal 29 and responds by generating a controller boom command signal 103 proportional to the loader boom command signal 29, which is received by the boom electro-hydraulic circuit 51. The boom electro-hydraulic circuit 51 responds to the controller boom command signal 103 by directing hydraulic fluid to and from the loader boom hydraulic cylinder 33 at a rate proportional to the controller boom command signal 103, causing the hydraulic cylinder 33 to move the loader boom 31 about the pivot 12a accordingly.

Parallel Lift and Initial Angular Setting of the Loader Tool

During a work operation with the loader bucket 36, such as lifting, lowering or transporting material, it is, at times, desirable to maintain an initial loader bucket orientation relative to the vehicle to reduce premature dumping of material as well as increase general operator convenience. In a conventional backhoe, to maintain the initial loader bucket orientation, with respect to the frame 12, as the loader boom 31 is lifted or lowered relative to the frame 12, the operator is required to continually manipulate the loader bucket command input device 21 to adjust the loader bucket orientation. The continual adjustment of the orientation of the loader bucket 36 requires a degree of attention and manual effort from the operator that diminishes overall work efficiency and increases operator fatigue.

The exemplary control system of the invention, illustrated in FIG. 3, is adapted to automatically maintain an initial or a set loader bucket orientation or tilt angle with respect to a datum, such as, for example, the vehicle frame 12, as an angle of the boom 31 changes. This embodiment of the invention makes use of at least a loader boom angle sensor 54 proximal to the first boom pivot 12a and a boom link angle sensor 55 proximal to the first boom link pivot 41a, both angle sensors 54, 55 being in communication with the controller 100. The loader boom angle sensor 54 is adapted to sense an angle of the boom relative to the frame 12, i.e., a boom to frame angle BmA and to generate a corresponding loader boom angle signal 54a. The bucket link angle sensor 55 is adapted to sense an angle of the bucket link 42 relative to the loader boom 31 and to generate a corresponding bucket link angle signal 55a. The controller 100 is adapted to receive the loader boom command signal 29, the loader boom angle signal 54a, the bucket command signal 28, and the bucket link angle signal 55a and to generate a controller bucket command signal 102 in response, causing the loader bucket actuator 60 to move the loader bucket 36 to maintain a desired loader bucket angle with respect to the frame 12 and, consequently, with respect to the boom 31.

Where the object of the invention is a parallel lift function to maintain an initial loader bucket angle, relative to the frame 12, the desired loader bucket angle is maintained unless maintenance of this angle interferes with other automatic functions such as, for example, return to dig, return to carry and anti-spill (to be described later) of higher precedence. Additionally, the controller 100 is adapted to allow a manual override of engaged parallel lift when the operator commands movement of the loader bucket 36, via a manipulation of the joystick 21 in a second direction, i.e., upon the controller 100 receiving the loader bucket command signal 28 while the parallel lift function is engaged, and establishing a new initial loader bucket orientation at the sensed orientation of the loader bucket 36 after the loader bucket command signal 28 terminates.

In the illustrated embodiment, the present invention also utilizes a parallel lift command switch 110 in communication with the controller 100. The parallel lift command switch 110 is adapted to generate a parallel lift enable signal 111 corresponding to a first manipulation of the parallel lift command switch 110 by the operator to enable operation of the parallel lift function for the loader bucket 36 and to generate a parallel lift disable signal 112 corresponding to a second manipulation of the parallel lift command switch 110. With respect to the parallel lift function, the controller 100 is adapted to ignore the loader bucket angle signal 56 until the controller 100 receives the parallel lift enable signal 111 from the parallel lift command switch 110. The parallel lift enable signal 111 places the controller 100 in a first mode where parallel lift is enabled or activated. The parallel lift disable signal 112 places the controller 100 in a second mode where parallel lift is disabled or deactivated. The controller 100 is also adapted to generate controller bucket command signals 102 and controller boom command signals 103 to manipulate the bucket 36 and the boom 31 in response to return to carry commands, returned to dig commands, and anti-spill commands which will be explained in some of the remaining portions of this document.

In operation, upon receiving a parallel lift enable signal 111, the controller 100 enters the second mode and uses a loader boom angle signal 54a and a bucket link angle signal 55a to determine an initial angle of the bucket 36 with respect to the frame 12, i.e., the bucket to frame angle. Of course, any calculation of the bucket angle must account for the geometry of the bucket. Thus, in this embodiment, the angle of the bucket 36 with respect to the frame 12 is calculated as α=BmA+BtA, where α equals the bucket to frame angle, BmA equals the boom to frame angle and BtA equals the angle of the bucket 36 with respect to the boom 31, i.e., the bucket to boom angle. The controller calculates the BtA by using the bucket link angle signal 55a to determine the angle of a back of the bucket 36 and subtracting OA, an offset angle, from the result, the offset angle being a corrective angle introduced to take the shape of the bucket 36 into account when determining an angle of an open face of the bucket 36. In this particular case the shape of the bucket 36 affords a difference between an angle of a face of the bucket 36 as represented by plane 36a and a back portion of the bucket pivotally connected to the boom 31 and the bucket link 42b as represented by plane 36b. Thus, α is the angle of the face of the bucket, i.e., the angle of plane 36a, with respect to the datum plane 12d, α going to 0° as the angular orientation of plane 36a approaches that of the datum plane 12d. In summary, the controller 100 uses the bucket link angle signal 55a to determine the angle of plane 36b with respect to the boom 31, i.e., boom plane 31d and the offset value is subtracted from that result to determine the angle of the BtA. The controller 100 uses the boom angle signal 54a to determine the BmA. Once the controller 100 determines the BmA and BtA the controller 100 can determine a by adding BmA and Bta. These and other determinations and/or calculations, throughout this embodiment, may be accomplished via a variety of conventional methods including: lookup tables, numerically derived equations, analytically derived equations taking the lengths of the boom link 54 and the bucket link 55 into account, etc.

Figure 4A:
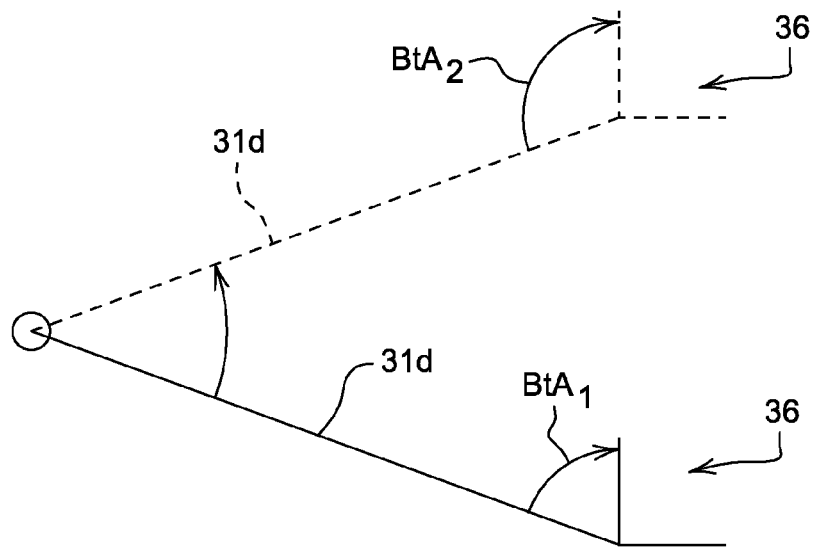
FIG. 4a illustrates how the angle of the loader tool changes as the boom rotates in an upward direction.
Figure 4B:
Figure 5A:
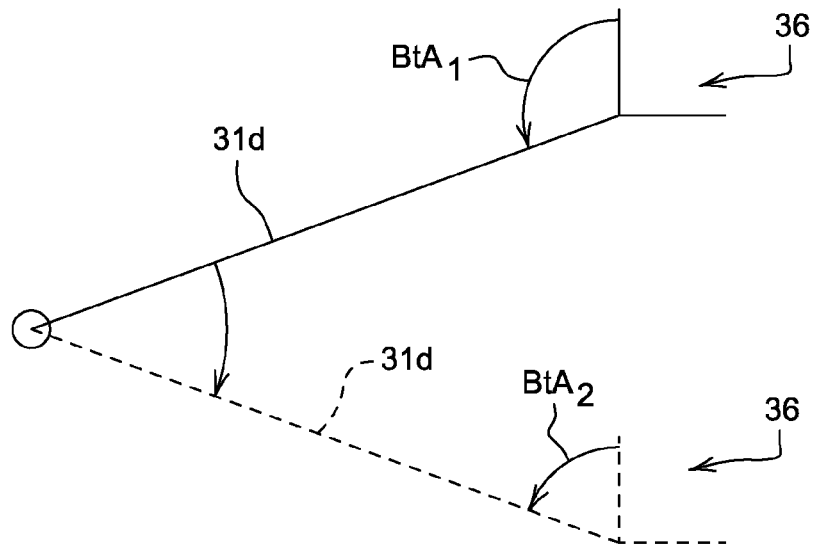
FIG. 5a illustrates how the angle of the loader tool changes as the boom rotates in an downward direction.
Figure 5B:
FIG. 5b is a schematic diagram illustrating how the angle of the loader tool changes as the boom rotates in an downward direction.

As the boom rises, α is maintained by adjusting the BtA in a motion resembling dumping, as illustrated in FIGS. 4A and 4B, as the BtA changes from $BtA_1$ to $BtA_2$. Thus, such adjustments shall be called "dumping" adjustments. As the boom lowers, α is maintained by adjusting BtA in a motion resembling curling, as illustrated in FIGS. 5A and 5B, as the BtA changes from $BtA_2$ to $BtA_1$. Thus, such adjustments shall be called "curling" adjustments.

Hybrid Control of Adjustments

As the boom 31 rises or lowers, the controller makes BtA adjustments by generating controller bucket command signals 102, i.e., bucket commands, to extend or retract the loader bucket hydraulic cylinder 32 as required by predictive and corrective control procedures. The predictive control procedures allow for quicker response times for the loader bucket 36. The corrective control procedures increase the accuracy of the response in approximating parallel lift.

In the predictive control procedures, the controller 100 calculates the BtA adjustments using only the loader boom command signal 29, the loader boom angle signal 54a and the geometries of the linkage 30, the bucket 36 and the boom 31. This allows for quick bucket adjustments, via bucket command signals 28, when the boom rises or lowers as the calculations merely depend upon geometry and the predicted rate of change in the BmA using the controller boom command signals 103 to predict the rate of change of the BmA, the flow rate to the loader boom hydraulic cylinder being proportional to the controller boom command signals 103. Of course, the controller 100 could, in other embodiments, also predict the rate of change in the BmA by determining the measured rate of change using the loader boom angle signals 54a over time. However, whichever method is used, the predictive procedure is an open loop procedure that could possibly introduce cumulative error as the calculations do not take actual BtA, i.e., feedback, into consideration.

The corrective procedure is a closed loop procedure in which possible error is reduced when the controller 100 uses the bucket link signal 55a to calculate an actual angle of the bucket 36 and act upon a difference between a predicted BtA and the actual BtA when the difference is equal to or greater than a threshold value such as, for example, 0° or 30°. The correction is made by adjusting the controller bucket command signal 102, taking the controller boom command signal 103, the boom angle signal 54a and the bucket link angle signal 55a into account, in an effort to reduce the difference to zero. In this embodiment, if the BtA is undercorrected beyond effective adjustment at the current flow rate for the boom 31, the controller 100 reduces the controller boom command signals 103 to zero until BtA changes such that α is correctly adjusted. Conversely, if the BtA is overcorrected, the controller reduces the controller bucket command 102 to zero until, taking BmA command into account, the BmA changes such that the BtA is correctly adjusted. Other embodiments could allow the controller 100 to correct the BtA in the opposite angular direction in the event of overcorrection.

Manual Override of Parallel Lift Via Joystick Manipulation

If the loader bucket 36 is manually commanded, via the joystick 21, to dump or curl while the parallel lift function is engaged, the parallel lift function continues to adjust the angle of the loader bucket 36 in a manner approximating parallel lift. However, as indicated in FIG. 6, the BtA is further adjusted in the direction of and in proportion to the manual command using the BtA due to parallel lift as a new zero point for BtA change rate. Naturally, the maximum rate of change for BtA is the same as the maximum rate of change for BtA with parallel lift disabled. In FIG. 6, the absolute value of 2000 represents a maximum command rate for the bucket and the absolute value of 1000 represents the parallel lift command rate. In this particular case, the controller 100 sets the values of 1000 and −1000 for parallel lift curl and parallel lift dump, respectively. As can be readily observed in FIG. 6, the controller 100 will, for this function, generate controller bucket command signals 102 proportional to the degree of manipulation of the joystick 21 between the absolute values of 1000 and the absolute values of 2000, using the absolute value of 1000 as the zero point, i.e., the target for controller bucket command signal 102 with no manipulation of the bucket command input device 21 and the absolute value of 2000 as the maximum, i.e., the target for the controller bucket command signal 102 with the maximum degree of manipulation of the joystick 21. Of course the absolute value of 1000 is referenced here merely for illustrative purposes. In reality the value used as a point of reference is dynamic, and changes as the boom command signal 29 changes or as the actual rate of change in the BmA changes.

This arrangement allows for greater control of the bucket 36 as the change in rate of the BtA with respect to the parallel lift function is proportional to the degree of manipulation of the bucket command input device 21.

Return to Carry, Return to Dig and Boom Height Kickout

During the operation of the loader portion 30 of a backhoe loader 10 it is oftentimes convenient for the operator to establish automatic functions such as, for example, return to carry (RTC), return to dig (RTD, and boom height kickout (BHK). The invention provides for these functions.

Return to Carry

Return to carry, i.e., RTC is a function that enables an operator to command the vehicle 10 to automatically locate the boom 31 at a first predetermined BmA such as, for example, σ1 in FIG. 7. The first predetermined BmA is set when the operator commands the boom 31 to move to σ1 and, by means of a button 58, records σ1 in the system, i.e., the controller 100, as a predetermined BmA for RTC.

To execute RTC, the operator pushes the electronic joystick 21 to a first detent position 21a, illustrated in FIG. 8, in which a detent is felt which is, generally, at the end of travel for the joystick 21. The joystick 21 then generates a first detent command signal 28a. The controller 100 receives the first detent command signal 28a then, if the BmA is greater than σ1, the controller 100 generates controller boom command signals 102 to move the boom 31 in the direction of σ1. If the joystick 21 is released to return to the neutral position 21a, to which it is biased, prior to the boom achieving and angle of σ1 the controller 100 will continue to generate controller boom command signals 102 to move the boom 31 toward σ1 until the boom 31 achieves the angle σ1. When the boom angle signal 54a indicates that the boom has achieved σ1, the controller 100 stops generating the controller boom command signals 102 resulting from the first detent signal 28.

Figure 9:
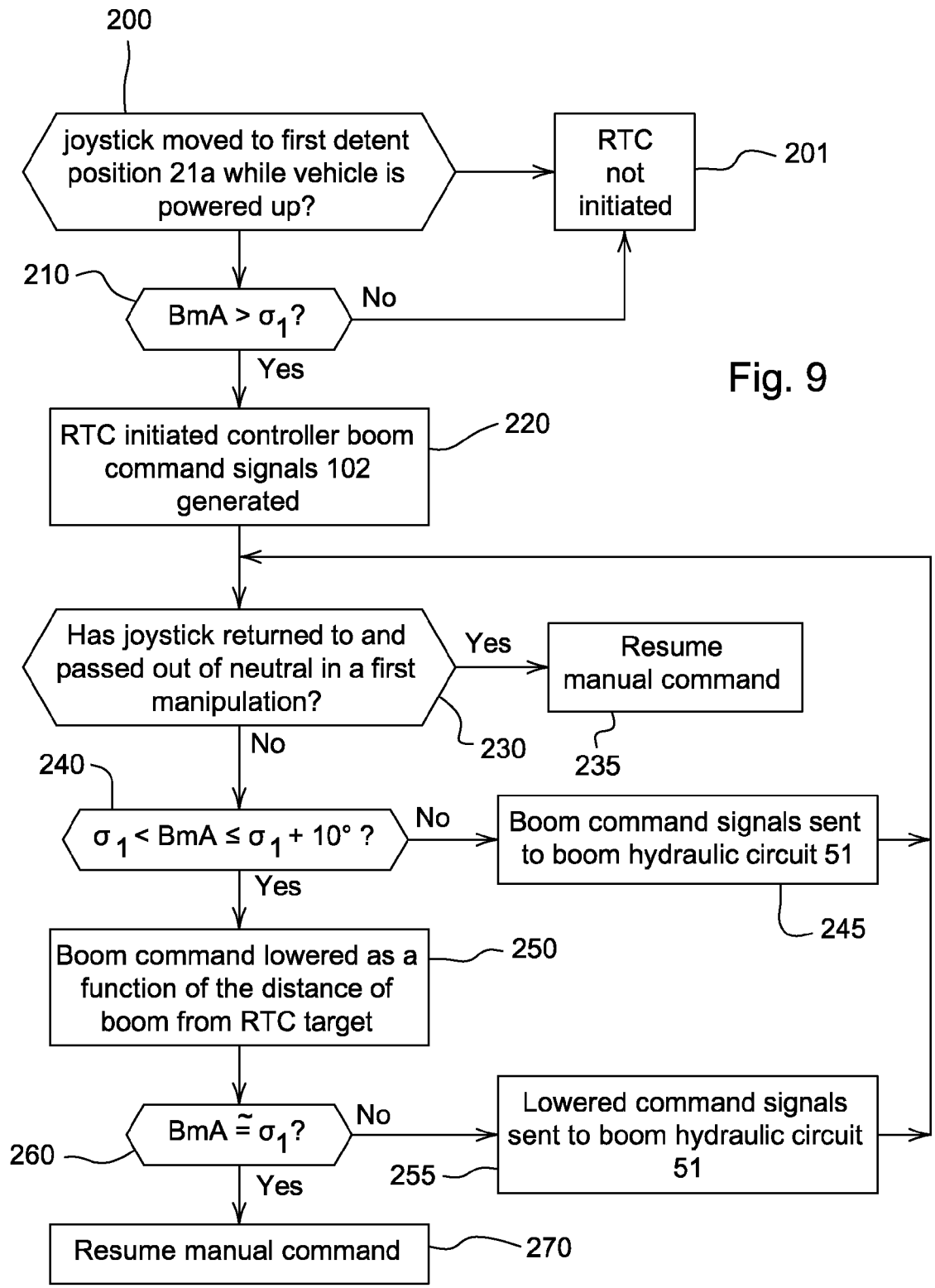
FIG. 9 illustrates a flow chart outlining the initiation and operation of return to carry.

FIG. 9 illustrates the initiation and operation of RTC in a more detailed and visual manner. As illustrated in FIG. 9, the RTC function can begin only when the operator pushes the electronic joystick 21 to the first detent position 21a at step 200, at which point it generates the first detent command signal 29a. The controller 100 compares BmA to σ1 at step 210 and initiates RTC at step 220 if BmA is greater than σ1. The controller 100 then initiates a return to carry command mode and generates controller boom command signals 103 at step 220 to move the boom 31 in the direction of σ1. The controller 100 then checks to see whether the joystick 21 has returned to and moved out of the neutral position 21c in the direction of 21a or 21b at step 230. If the answer is yes, the controller 100 resumes manual control. If the answer is no, the controller 100 then checks to see if the relationship σ1<BmA≦σ1+10° is true at step 240. In this embodiment the 10° in the relationship is a cushion start angle. The cushion start angle could be set at any value. If the equation is not true then the controller boom command signals 103 are sent to the boom electrohydraulic circuit 51 at step 245. If the equation is true, then, at step 250, the controller boom command signals 103 are lowered as a function of X, where X is the distance of the boom 31 from the target at σ1. In this particular embodiment, the boom command equals $X_{0.75}$+Offset, where Offset represents a minimum command at the end of any automatic function of the loader portion 30. The controller 100 then checks to see if the equation, BmA≈σ1, is true at step 260. If the equation is not true, then the controller 100 sends the lowered command signal to the boom electrohydraulic circuit 51 at step 255. If the equation is true, the controller 100 resumes the manual command mode at step 270.

Boom Height Kickout

Boom height kickout is a function that enables an operator to command the vehicle 10 to automatically locate the boom 31 at a second predetermined BmA such as, for example, σ2 in FIG. 6. The second predetermined BmA is set when the operator commands the boom 31 to move to σ2 and, by means of a button 58, records σ2 in the system, i.e., the controller, as a predetermined BmA for boom height kickout.

To execute boom height kickout, the operator pulls the electronic joystick 21, illustrated in FIG. 8, to a second detent position 21b in which a detent is felt which is, generally, at the end of travel for the joystick 21. The joystick 21 then generates a second detent command signal 28b. The controller 100 receives the second detent command signal 28b then, if the BmA is less than σ2, the controller 100 generates controller boom command signals 10 to move the boom 31 in the direction of σ2. If the joystick 21 is released to return to the neutral position 21c, to which it is biased, prior to the boom achieving and angle of σ2 the controller 100 will continue to generate controller boom command signals 102 to move the boom 31 toward σ2 until the boom 31 achieves the angle σ1. When the boom angle signal 54a indicates that the boom has achieved σ1, the controller 100 stops generating the controller boom command signals 102 resulting from the second detent command signal 28b.

Figure 10:
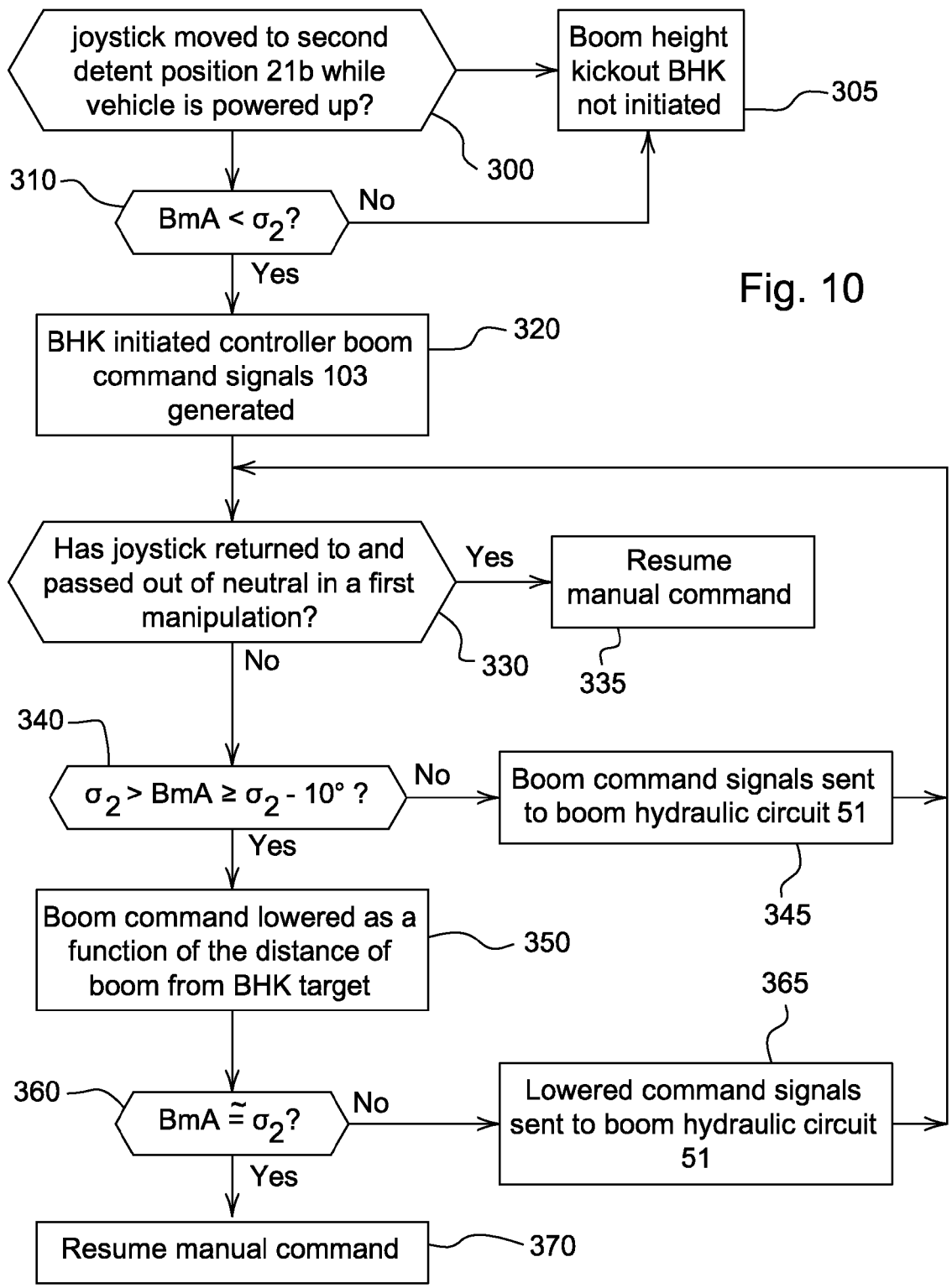
FIG. 10 illustrates a flow chart outlining the initiation and operation of boom height kickout.

FIG. 10 illustrates the initiation and operation of the boom height kickout function in a more detailed and visual manner. As illustrated in FIG. 7, the boom height kickout function can begin only when the operator pulls the electronic joystick 21 to the second detent position 21b at step 300, at which point it generates the second detent command signal 28b. The controller 100 compares BmA to σ2 at step 310 and initiates boom height kickout at step 320 if BmA is less than σ1. The controller 100 then initiates a boom height kickout command mode and in which it generates controller boom command signals 102 at step 320 to move the boom 31 in the direction of σ2. The controller 100 then checks too see if the joystick 21 has returned to neutral 21c and moved out of neutral in the direction of 21a or 21b at step 330. If the answer is yes, the controller 100 resumes the manual command mode at step 335. If the answer is no, the controller 100 then checks to see if the relationship σ2>BmA≧σ2−10° is true at step 340. If the relationship is not true then the controller boom command signals 103 are sent to the boom electrohydraulic circuit 51 at step 335 and the process starts again at step 330. If the equation is true, then, at step 350, the controller boom command signals 103 are lowered as a function of X, where X is the distance of the boom 31 from the target at σ1 at step 350. In this particular embodiment, the boom command equals $X^{0.75}$−Offset, where Offset represents a minimum command at the end of any automatic function of the loader portion 30. The controller 100 then checks to see if the equation, BmA≈σ2, is true at step 360. If the equation is not true, then the controller 100 sends the lowered command signal to the boom electrohydraulic circuit 51 at step 365 and starts the process over at step 330. If the equation is true, the controller 100 resumes the manual command mode at step 370.

In this embodiment the 10° in the above relationship is a cushion start angle. The cushion start angle could be set at any value.

If the joystick is moved to the first detent position when the boom is at or below the return to carry position, the controller 100 executes a float function where the cylinders 32, 33 are free to extend and retract under the influence of gravity allowing the boom to fall to the lowest point allowed by the ground and for the boom and bucket to follow the contours of the ground as the vehicle moves over the ground. The controller 100 may execute the float function by conventional means.

Return to Dig

Return to dig is a function that enables an operator to command the vehicle 10 to automatically locate the bucket 36 at a return to dig Bta, β1, and a return to dig angle $α_{rtd}$ suitable for digging. β1 and $α_{rtd}$ are set when the operator commands the bucket 36 to move to β1 and, by means of a button 58, records β1 in the system, i.e., the controller 100, as a predetermined return to dig BtA and a predetermined bucket to frame angle $α_{rtd}$ for return to dig. Return to dig is, generally, used to place the bucket 36 in and angular position favored for digging or scooping up material. When the controller 100 executes return to dig it suspends parallel lift if it is active. When the bucket 36 reaches the return to dig BtA, parallel lift is resumed if the controller 100 detects that it is still active and maintains $α_{rtd}$. In this manner, the controller 100 will maintain the bucket orientation at $α_{rtd}$ until the parallel lift function is completed.

To execute return to dig, the operator moves the electronic joystick 21, illustrated in FIG. 8, to a third detent position 21d in which a detent is felt which is, generally, at the end of travel for the joystick 21. The joystick 21 then generates a third detent command signal 28c. The controller 100 receives the third detent command signal 28c then, if the BtA is greater than 1, the controller 100 generates controller bucket command signals 103 to move the bucket 36 in the direction of β1 via dumping. If BtA is less than 1, the controller generates controller bucket command signals to move the bucket 36 in the direction of β1 via curling. If the joystick 21 is released to return to the neutral position 21c, to which it is biased, prior to the bucket 36 achieving an angle of β1 the controller 100 will continue to generate controller bucket command signals 103 to move the bucket 36 toward β1 until the bucket 36 achieves the angle β1. When the bucket angle signal 55a indicates that the bucket has achieved β1, the controller 100 stops generating the controller bucket command signals 103 resulting from the third detent command signal 28c.

Figure 11:
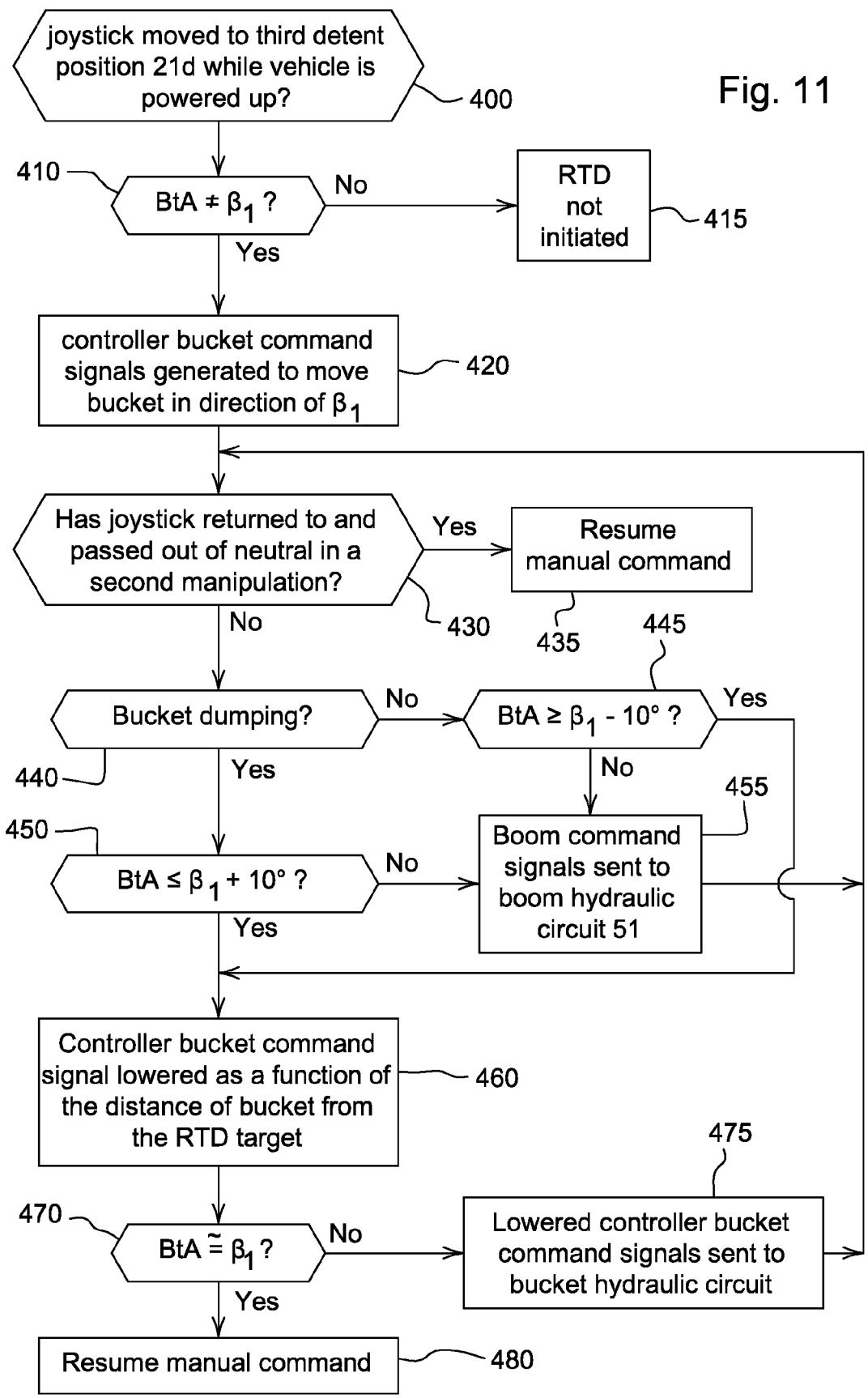
FIG. 11 illustrates a flow chart outlining the initiation and operation of return to dig.

FIG. 11 illustrates the initiation and operation of the return to carry function in a more detailed and visual manner. As illustrated in FIG. 11, the return to dig function can begin only when the operator moves the electronic joystick 21 to the third detent position 21d at step 400, at which point it generates the third detent command signal 28c. The controller 100 compares BtA to β1 at step 410 and initiates returned to carry at step 420 if BtA is not equal to β1. The controller 100 then enters a return to dig mode and generates controller bucket command signals 103 at step 420 to drive the bucket 36 to β1. The controller 100 then checks too see if the joystick 21 has returned to neutral 21c and moved out of neutral in the direction of 21d or 21e at step 430. If the answer is yes, the controller 100 resumes the manual command mode at step 435. If the answer is no, the controller 100 then checks to see if the bucket 36 is dumping at step 440. If the bucket 36 is dumping at step 440, i.e., the BtA is increasing, the controller 100 determines if a first equation BtA≦β1+10° is true at step 440. If the first equation is not true then the controller bucket command signals 103 are sent to the bucket electrohydraulic circuit 61 at step 455 and the process starts over at step 430. If the first equation is true, then, at step 460, the controller boom command signals 103 are lowered as a function of X, where X is the distance of the boom 31 from the target at σ1 at step 350. In this particular embodiment, the boom command equals $X^{0.75}$+Offset, where Offset represents a minimum command at the end of any automatic function of the loader portion 30. The controller 100 then checks to see a second equation, BtA≈β1, is true at step 470. If the second equation is not true, then the controller 100 sends the lowered command signal to the bucket electrohydraulic circuit 61 at step 455 and starts the process over at step 430. If the second equation is true, the controller 100 resumes the manual command mode at step 480.

If, at step 440, the controller 100 determines that the bucket 36 is curling, i.e., BtA is decreasing, the controller determines whether a third equation BtA≧β1−10° is true at step 445. If the third equation is not true then the controller bucket command signals 103 are sent to the bucket electrohydraulic circuit 61 at step 455 and the process is restarted at step 430. If the third equation is true, then, the process is moved to step 460 and proceeds as described above.

In this embodiment the 10° values in the above relationships are cushion start angles. The cushion start angles could be set at any values.

If return to carry and return to dig are executed such that they are both functioning at the same time, the controller 100 may reduce the controller boom command signals 103 to allow a completion of return to dig prior to a completion of return to carry to prevent the bucket 36 from contacting the ground at a wrong angle.

Anti-Spill

Anti-spill is an automatic bucket control feature that restricts the bucket 36 from being curled past a predetermined bucket to frame position $\alpha_{ata}$ once a predetermined boom to frame position $BmA_{ata}$ is realized or exceeded. The purpose of this feature is to prevent the spilling of material in the bucket 36 onto the hood 21 or the cab 20 of the vehicle 10. When anti-spill is activated the controller 100 will override any function, including, inter alia, parallel lift and return to dig when that function demands a bucket to frame position α curled past the predetermined bucket to frame position $\alpha_{ata}$ and adjusts the bucket 36 in the dumping direction when the boom is raised beyond $BmA_{ata}$, i.e., within the anti-spill zone. In this particular embodiment, the controller 100 generates controller bucket command signals 103 to drive the bucket 36 to the anti-spill target angle $\alpha_{ata}$., i.e., to adjust the bucket 36 to a position such that $\alpha \approx \alpha_{ata}$. The controller 100 suspends this process only when: (1) the boom 31 is no longer moving; (2) the boom 31 is adjusted downwardly while still in the anti-spill zone; (3) the boom 31 is outside of the anti-spill zone; or (4) the operator manipulates the joystick 21 to generate a bucket command signal 29 to dump.

Figure 13:
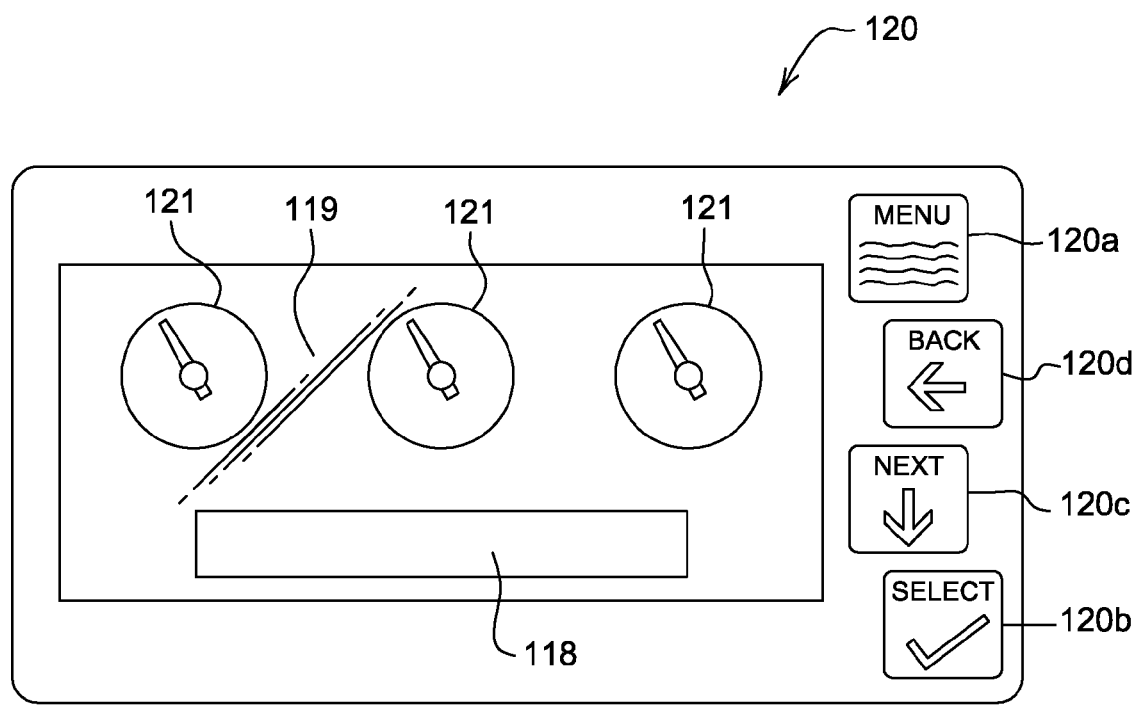
FIG. 13 illustrates a monitor used for anti-spill settings.

$BmA_{ata}$ and $\alpha_{ata}$ are separately set via menu selections using buttons 120a, 120b, 120c, 120d and the screen 118 on the monitor 120 illustrated in FIG. 13. However, anti-spill target setting may be accomplished by any appropriate and well-known conventional means such as, for example, separate button switches or multi-function button switches. Regardless of how the predetermined angles $BmA_{ata}$ and $\alpha_{ata}$ are set, anti-spill is a feature that is activated when the vehicle 10 is powered up.

Figure 12:
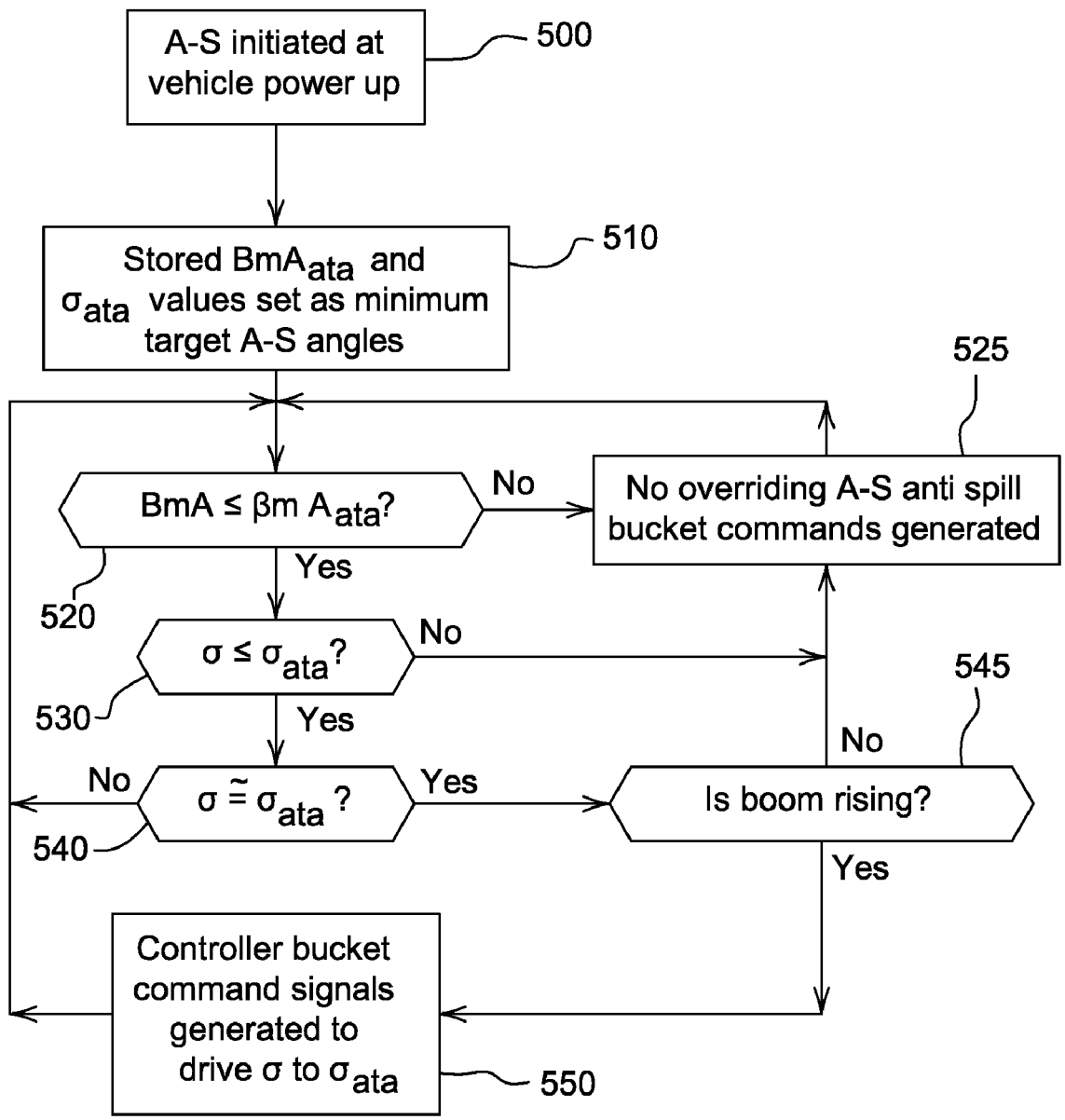
FIG. 12 illustrates the operation of the anti-spill function.

FIG. 12 illustrates the operation of the anti-spill function in a more detailed and visual manner. As illustrated in FIG. 12, the anti-spill function begins when the vehicle 10 is powered up at step 500, at which point the controller 100, at step 510, sets $BmA_{ata}$ and $\alpha_{ata}$ as minimum target angles whether these predetermined angles are factory settings or custom settings by the operator. The controller 100 then determines if a first anti-spill relationship $BmA \leq BmA_{ata}$ is true at step 520. If the first anti-spill equation is not true, no overriding anti-spill bucket commands are generated and the controller 100 makes another determination on the first anti-spill equation, at step 520, at the next sample time which is determined by a predetermined sample rate. If the first anti-spill relationship is true, the controller 100 determines whether a second anti-spill relationship, $\alpha \leq \alpha_{ata}$ is true at step 530. If the second anti-spill relationship is not true, no overriding anti-spill bucket commands are generated and the controller 100 begins the process again by determining whether the first anti-spill equation is true at step 520. Once the controller 100 determines that the first and second anti-spill equations are true at steps 520 and 530, the controller determines whether the controller 100 boom command signal 102 is commanding a decrease in BmA, i.e., determines whether BmA is decreasing. If BmA is not decreasing, no overriding anti-spill bucket commands are generated and the controller 100 returns to step 520 to determine whether the first anti-spill relationship is true at the next sample time. Once the controller 100 determines that the first and second anti-spill relationships are true at steps 520 and 530 and that BmA is decreasing at step 540, i.e., the boom 31 is rising, the controller 100, at step 550, generates controller bucket command signals 102 to drive the bucket 36 to $\alpha_{ata}$ and repeats the entire process again starting at step 520 at the next sample time.

The illustration in FIG. 12 demonstrates that the controller 100 will override any bucket commands once the conditions for the anti-spill function are met. Thus, if the operator is curling the bucket 36 past $\alpha_{ata}$ after the boom 31 enters the anti-spill zone, the controller 100 will generate controller bucket command signals 102 to drive the bucket 36 to $\alpha_{ata}$. Further, if the bucket 36 is being dumped via parallel lift when the boom enters the anti-spill zone and the bucket to frame angle α is less than or equal to $\alpha_{ata}$, the controller 100 will override parallel lift and generate controller bucket command signals 102 to drive the bucket 36 to $\alpha_{ata}$. Finally, if the boom 31 is within the anti-spill zone the and bucket to frame angle α is, for any reason, less than or equal to $\alpha_{ata}$, the controller 100 will override parallel lift and generate controller bucket command signals 102 to drive the bucket 36 to $\alpha_{ata}$.

Figure 14:
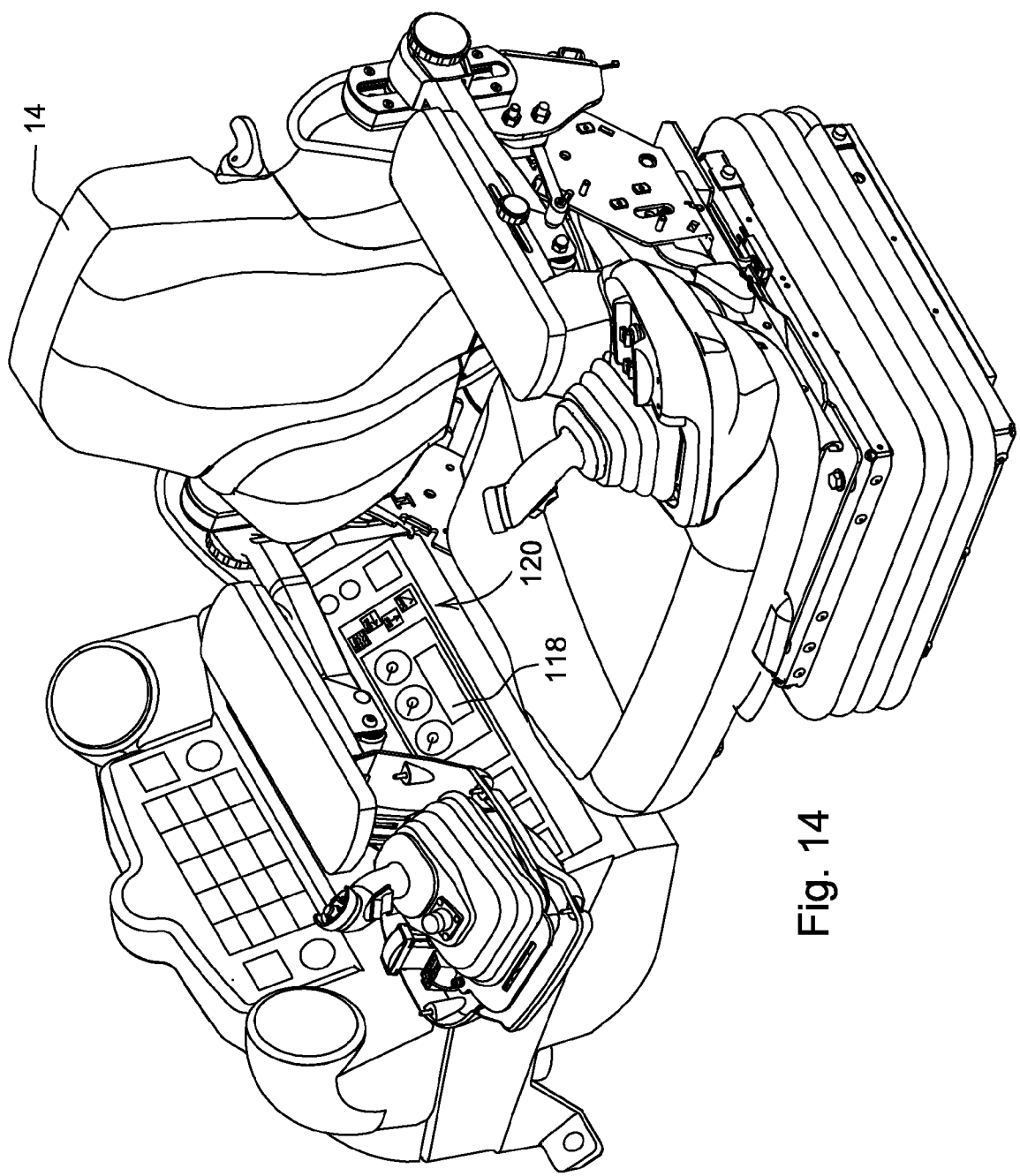
FIG. 14 illustrates a backhoe loader chair 14 showing the position of the monitor in FIG. 13.

In this particular embodiment, $BmA_{ata}$ may be set only when the BmA is between −6° and +20° and $\alpha_{ata}$ maybe set only when the bucket angle α miss between +6° and +17°. Successful or unsuccessful target setting is indicated by an audible signal and/or a message via the monitor 120 illustrated in FIGS. 13 and 14. Unsuccessful target setting may be indicated on a display in words such as, for example, "Out of Range" on the monitor screen 118. If no custom targets are set by the operator, the anti-spill function uses a the factory set targets.

Alternate Embodiment of the Invention

Figure 15:
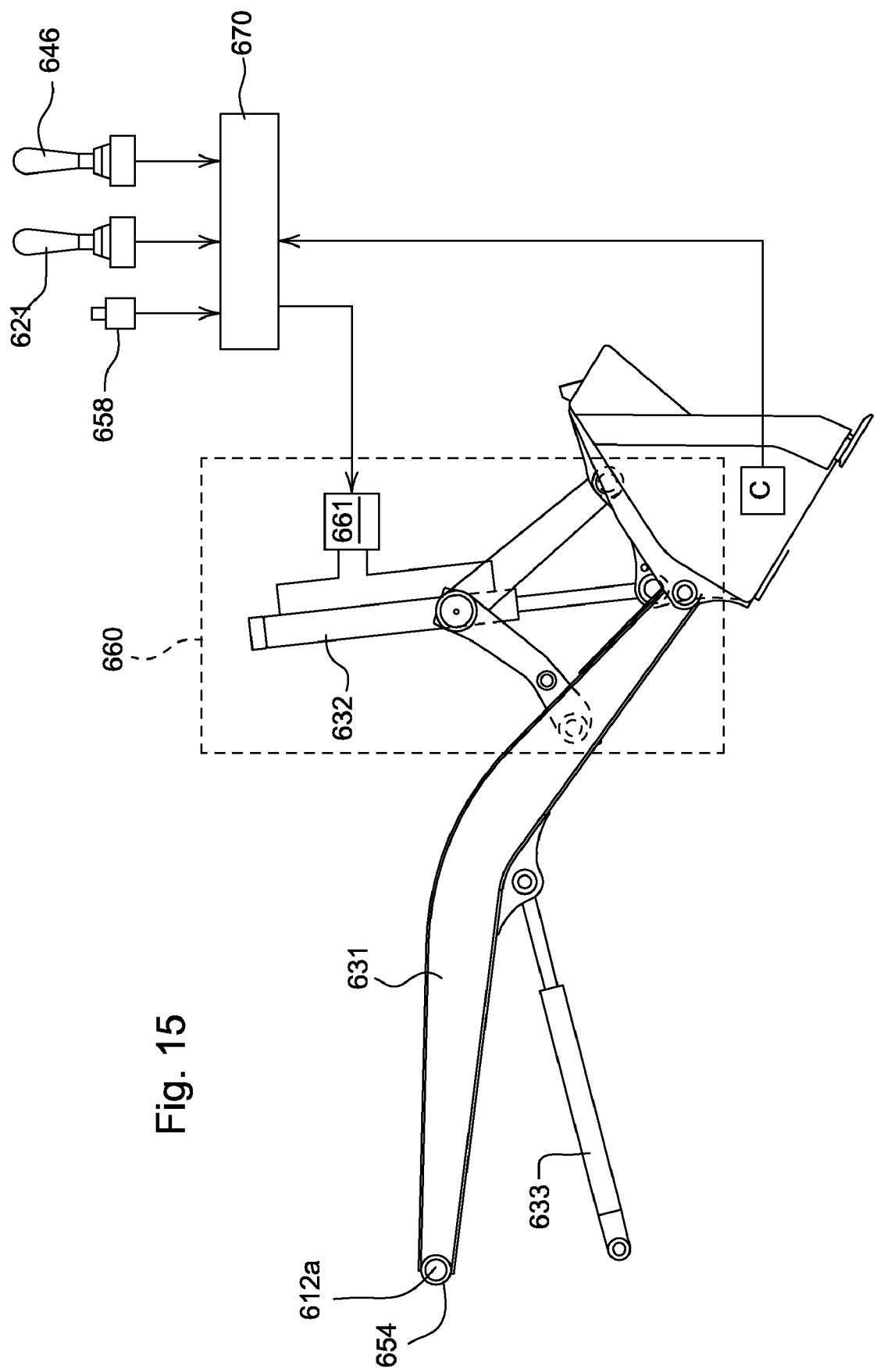
FIG. 15 illustrates a schematic of an alternate embodiment of the components of the invention.

FIG. 15 illustrates a schematic representing an alternate exemplary embodiment of the invention. In FIG. 15, a loader boom actuator 50, having a loader boom hydraulic cylinder 633 extending between the vehicle frame 12 and the loader boom 31, controllably moves the loader boom 31 about the loader boom pivot 12a. The loader boom hydraulic cylinder 33 is pivotally attached to the frame 12 at a first loader boom hydraulic cylinder pivot 33a and pivotally attached to the loader boom 31 at a second loader boom hydraulic cylinder pivot.

A loader bucket actuator 660, having a loader bucket hydraulic cylinder 32 extending between the loader boom 631 and the loader bucket 36, controllably moves the loader bucket 36 about the loader bucket pivot 36a. In the illustrated embodiment, the loader bucket actuator 660 comprises a bucket electro-hydraulic circuit 661 hydraulically coupled to the loader bucket hydraulic cylinder 632. The controller 670 controls the bucket electro-hydraulic circuit 661 which supplies and controls the flow of hydraulic fluid to the loader bucket hydraulic cylinder 632. Note that the bucket hydraulic circuit 61 are conventionally configured.

The operator commands movement of the loader assembly 30 by manipulating a loader bucket command input device such as, for example a joystick 621 and a loader boom command input device such as, for example the joystick 21. The joystick 21 is adapted to generate a loader bucket command signal 628 in proportion to a degree of manipulation by the operator and proportional to a flow rate of fluid to the bucket hydraulic cylinder 632 which is indirectly proportional to an angular speed of a desired loader bucket movement. The controller 670, in communication with the loader bucket command input device 621 and loader bucket actuator 660, receives the loader bucket command signal 628 and responds by generating a controller bucket command signal 672 proportional to the bucket command signal 628, which is received by the loader bucket electro-hydraulic circuit 661. The loader bucket electro-hydraulic circuit 661 responds to the controller bucket command signal 672 by directing hydraulic fluid to and from the loader bucket hydraulic cylinder 632, causing the hydraulic cylinder 632 to extend and retract and curl and dump the loader bucket 636 accordingly.

The joystick 621 is adapted to generate a loader boom command signal 629 in proportion to a degree of manipulation in a first direction of the joystick 621 by the operator, the boom command signal 629 being proportional to a flow rate of fluid to the hydraulic boom cylinder 633 and indirectly proportional to a speed of a desired loader boom movement. The controller 670, in communication with the joystick 621 and loader boom cylinder 633, receives the loader boom command signal 629 and responds by generating a controller boom command signal 673 proportional to the loader boom command signal 629, which is then used conventionally by a hydraulic circuit to adjust the length of the hydraulic boom cylinder 631.

In this embodiment the controller 670 uses angular signals from a tilt sensor C to determine the angle of the bucket with respect to the ground $\alpha_{ground}$ to execute the parallel lift function.

Having described the illustrated embodiment, it will become apparent that various modifications can be made without departing from the scope of the invention as defined in the accompanying claims. One such modification would be the addition of a tilt sensor to the frame 12 of the vehicle 10. This would allow all angular signals to reference the earth as well as the frame 12.

The invention claimed is:

1. A backhoe loader, comprising:
    a frame;
    a boom having a first boom end and a second boom end, the first boom end pivotally attached to the frame;
    a tool pivotally attached to the second boom end, the tool being adapted to perform a work function;
    a tool actuator adapted to controllably pivot the tool about the second boom end;
    a boom actuator adapted to controllably pivot the boom about the frame;
    a controller in communication with at least one of the tool actuator and the boom actuator, the controller having a first mode and a second mode;
    a command input device in communication with the controller, the command input device adapted to generate a first boom command signal upon a first manipulation of the command input device corresponding to a desired boom movement, the command input device adapted to generate a first tool command signal upon a second manipulation of the tool command input device corresponding to a desired tool movement; and
    at least one sensor detecting an inclination of the tool with respect to the frame and generating a corresponding tool angle signal indicative of the inclination of the tool, the first mode enabling the controller to receive the first tool command signal and ignore the tool angle signal while generating first controller command signals controlling at least one of the tool actuator and the boom actuator, the second mode enabling controller to respond to the tool angle signal and generate second controller command signals to maintain the inclination of the tool by controlling the at least one of the tool actuator and the boom actuator, the second mode allowing the controller to receive first tool command signals and generate third controller command signals controlling the tool actuator, the controller capable of making the third controller command signals proportional to the second manipulation of the command input device using a second controller command signal to the tool as the third controller command signal at no second manipulation of the command input device and a maximum second controller command as the third controller command signal at a maximum second manipulation of the tool command input device.

2. The backhoe loader of claim 1, further comprising a mode switch, the mode switch having a first state and a second state, the first state placing the controller in the first mode, the second state placing the controller in the second mode.

3. The backhoe loader of claim 1, wherein the command input device is a joystick.

4. The backhoe loader of claim 1, wherein the first manipulation is a fore and aft movement of the joystick and the second manipulation is a side to side manipulation of the joystick.

5. The backhoe loader of claim 1, wherein the tool actuator comprises a hydraulic circuit, a hydraulic cylinder and a linkage, the linkage operatively coupled to the hydraulic cylinder and the tool, the linkage and the hydraulic cylinder manipulating the tool as the hydraulic cylinder extends and retracts.

6. The backhoe loader of claim 5, wherein the linkage comprises: a boom link having a first boom link end and a second boom link end, the first boom link end pivotally connected to the boom, the second boom link end pivotally connected to the hydraulic cylinder at a first pivotal position; a bucket link having a first bucket link end and a second bucket link end, the first bucket link end pivotally connected to the hydraulic cylinder at a second pivotal position and the second bucket link end pivotally connected to the bucket, the hydraulic cylinder pivotally connected to the bucket at a third pivotal position, the linkage, the boom, the bucket and the hydraulic cylinder forming a geometry that changes at each inclination of the bucket.

7. The backhoe loader of claim 6, wherein the first pivotal position and the second pivotal position are the same.

8. The backhoe loader of claim 6, wherein the controller maintains the inclination of the tool as a function of the linkage geometry, the tool geometry and the boom angle by generating a controller command signal, as a function of a predicted boom angle change, to adjust a length of the hydraulic cylinder to modify the linkage geometry in proportion to the predicted boom angle change, the predicted boom angle change being calculated as a function of the controller command signal to the boom actuator.

9. The backhoe loader of claim 8, wherein the controller generates a correcting controller command signal to at least one of the boom actuator and the tool actuator to correct the inclination of the tool, the correcting controller command signal generated as a function of measured boom to frame angles and measured tool to boom angles from a lookup table, the measured boom to frame angles and tool to boom angles being functions of the boom angle signals and tool angle signals, respectively.

10. The backhoe loader of claim 8, wherein the controller receives a new tool angle signal indicating a second tool inclination as the boom assumes a new angular position, compares the second tool inclination to the initial tool inclination and modifies the second tool inclination, via the tool actuator, to reduce a difference between the initial tool inclination and the second tool inclination when the difference is above a threshold value.

11. The backhoe loader of claim 9, wherein the at least one sensor comprises a boom angle sensor to detect the angle of the boom with respect to the frame and a boom link angle sensor to detect the angle of the tool with respect to the boom.

12. The backhoe loader of claim 11, wherein the controller determines the tool inclination as a function of the angle of the boom with respect to the frame and the angle of the tool with respect to the boom.

13. The backhoe loader of claim 12, wherein the controller calculates the tool inclination via matching detected boom angle sensor signals with stored boom angle values in a table and comparing those values with stored values for the angle of the boom link with respect to the boom.

14. The backhoe loader of claim 13, wherein the controller interpolates between stored values for the angle of the boom with respect to the frame and between stored values for the angle of the boom link with respect to the boom to calculate an adjustment for the tool inclination.

15. The backhoe loader of claim 3, wherein the second mode enables the controller to modify the first tool command signal as a function of a rate of change in the angle of the boom.

16. The backhoe loader of claim 15, wherein, to maintain the inclination of the tool, a rate of curl for the tool with respect to the boom is adjusted as a function of an rate of angular travel for the boom in a downward direction and a rate of dump for the tool with respect to the boom is adjusted as a function of a angular rate of angular travel for the boom in an upward direction.

17. The backhoe loader of claim 16, wherein the tool command input device is a joystick.

18. The backhoe loader of claim 17, wherein a movement of the joystick adjusts at least one of the rate of curl and the rate of dump differently than the movement of the joystick when the controller is in the first mode.

19. The backhoe loader of claim 18, wherein the joystick adjusts a rate of change in the angle of the tool with respect to the boom, via fluid flow rates to the tool cylinder, in proportion to a percent travel of the joystick from a minimum displacement to a maximum displacement, a maximum rate of change in the angle of the tool with respect to the boom occurring at the maximum displacement, a minimum rate of change being equal to a rate of change in angle for the tool with respect to the boom adjusted as a function of the rate of angular travel for the boom.

20. The backhoe loader of claim 3, wherein the joystick has a first detent position and a neutral position, a movement of the joystick to the first detent position causing the joystick to send the controller a return to carry signal, the return to carry command signal enabling the controller to drive the boom, via controller command signals to the boom actuator, to a first predetermined boom angle which is lower than a boom angle at a time the joystick was moved to the first detent position.

21. The backhoe loader of claim 20, wherein the controller lowers the controller command signals to the boom actuator by a function of X where X is the difference between a current boom angle and the first predetermined boom angle, when a current boom angle is higher than the first predetermined boom angle and at least one of equal to the first predetermined boom angle plus a cushion start angle and less than the first predetermined boom angle plus the cushion start angle, X being the angular distance in radians to the first predetermined boom position from the current boom position.

22. The backhoe loader of claim 20, wherein returning the joystick to a neutral position subsequent to the movement of the joystick to the first detent position resumes the return to carry command signal enabling the controller to drive the boom to the predetermined boom angle, via controller command signals, and to stop the controller command signals when the boom reaches the first predetermined boom angle.

23. The backhoe loader of claim 20, wherein, a movement of the joystick to any position between the first detent position and the neutral position prior to the boom reaching the first predetermined boom angle cancels the return to carry command signals and returns the boom to manual control via the joystick.

24. A loader control system for a backhoe loader, the backhoe loader having a frame, the tool control system comprising:
 a boom having a first boom end and a second boom end, the first boom end pivotally attached to the frame at a first pivot;
 a tool pivotally attached to the second boom end at a second pivot, the tool being adapted to perform a work function;
 a tool actuator adapted to controllably pivot the tool about the second pivot;
 a boom actuator adapted to controllably pivot the boom about the first pivot;
 a controller in communication with the tool actuator and the boom actuator, the controller having a first mode and a second mode;
 at least one command input device in communication with the controller, the at least one command input device adapted to generate a first tool command signal upon a first manipulation of the at least one command input device corresponding to a desired angular movement of the tool with respect to the boom, the at least one command input device adapted to generate a first boom command signal upon a second manipulation of the at least one command input device corresponding to a desired angular boom movement with respect to the frame;

a tool angle sensor proximate to the second pivot detecting an inclination of the tool with respect to the boom and generating a corresponding tool angle signal indicative of the inclination of the tool; and a boom angle sensor proximate to the first pivot detecting the inclination of the boom with respect to the frame and generating a corresponding boom angle signal indicative of the inclination of the boom, the controller, in the first mode, capable of receiving the first tool command signal and generating first controller command signals controlling at least one of the tool actuator and the boom actuator, the controller, in the second mode, capable of receiving the tool angle signal and the boom angle signal, storing the inclination of the tool at the time the desired boom movement is initiated and generating second controller command signals to maintain the inclination of the tool by controlling the at least one of the tool actuator and the boom actuator, the controller capable of storing and maintaining a new inclination of the tool whenever a new first controller command signal places the tool at the new inclination of the tool and the at least one sensor generates a new tool angle signal, the controller combining the first and second controller command signals, when both the first and second command signals are being generated, by adjusting the first controller command signals such that they are proportional to a first manipulation of the at least one command input device, the controller setting a current second controller command signal to control the tool actuator as the first controller command signal to the tool actuator for no manipulation of the at least one command input device and a maximum second controller command signal as the first controller command signal to the tool actuator for a maximum manipulation of the at least one command input device.

25. The loader control system of claim 24, wherein the at least one input device comprises a joystick.

26. The loader control system of claim 24, wherein the first manipulation comprises a fore-aft movement of the joystick and the second manipulation is a side to side movement of the joystick.

27. The loader control system of claim 24, further comprising a mode switch, the mode switch having a first state and a second state, the first state placing the controller in the first mode, the second state placing the controller in the second mode.

* * * * *